United States Patent
Gardner et al.

(10) Patent No.: US 7,540,641 B2
(45) Date of Patent: Jun. 2, 2009

(54) APPARATUS AND METHOD FOR DIMMING FUNCTION TO CONTROL LED INTENSITY

(75) Inventors: Cornel Gardner, Romulus, MI (US);
James Chinavare, Manchester, MI (US);
Frank Desjarlais, Canton, MI (US);
Marion Westby, Dearborn, MI (US);
Daniel Fisher, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 11/672,702

(22) Filed: Feb. 8, 2007

(65) Prior Publication Data

US 2008/0192499 A1    Aug. 14, 2008

(51) Int. Cl.
*B60Q 1/26* (2006.01)
*G05F 1/00* (2006.01)

(52) U.S. Cl. .................. 362/488; 362/471; 315/297

(58) Field of Classification Search ......... 362/488–492, 362/466, 471; 315/77, 82, 291, 297, 307, 315/308, 312, 360, 362; 40/593
See application file for complete search history.

(56) References Cited

U.S. PATENT DOCUMENTS

| | | |
|---|---|---|
| 4,029,991 A | 6/1977 | Schultz |
| 4,156,166 A | 5/1979 | Shapiro et al. |
| 4,237,405 A | 12/1980 | Kellis |
| 4,326,161 A | 4/1982 | Kreinberg |
| 4,739,226 A | 4/1988 | Murata |
| 4,841,198 A | 6/1989 | Wilhelm |
| 5,053,677 A | 10/1991 | Sanner et al. |
| 5,406,171 A | 4/1995 | Moody |
| 6,152,588 A | 11/2000 | Scifres |

(Continued)

FOREIGN PATENT DOCUMENTS

GB    2407406 A    4/2005

(Continued)

OTHER PUBLICATIONS

Agilent Technologies introduces tricolor LED for feature-rich, next generation handsets and PDAs; 1 page; Dec. 6, 2006; http://www.agilent.com/about/newsroom/presrel/2003/31jan...

(Continued)

*Primary Examiner*—Bao Q Truong
(74) *Attorney, Agent, or Firm*—Frank A. MacKenzie; Brooks Kushman P.C.

(57) ABSTRACT

In one non-limiting embodiment, a system is provided for controlling interior lighting in a vehicle. The system is adapted to project a preselected color of light selected by user from a plurality of colors. The system generally includes one or more light emitting devices arrangements, a color selection device and a controller. The one or more lighting arrangements are positioned throughout the vehicle and capable of projecting the plurality of colors of light. The color selection device is configured to generate a signal. The controller is operable to present one or more pulse width modulated (PWM) signals which correspond to the preselected color of light to the lighting arrangements in response to the signal.

18 Claims, 5 Drawing Sheets

U.S. PATENT DOCUMENTS

| | | |
|---|---|---|
| 6,158,882 A | 12/2000 | Bischoff, Jr. |
| 6,307,330 B1 | 10/2001 | So |
| 6,329,755 B1 | 12/2001 | Nakade et al. |
| 6,426,569 B1 | 7/2002 | Ichikawa et al. |
| 6,498,440 B2 | 12/2002 | Stam et al. |
| 6,768,268 B2 | 7/2004 | Fujita et al. |
| 6,870,329 B2 | 3/2005 | Krieger et al. |
| 6,980,119 B2 | 12/2005 | Toulmin et al. |
| 7,067,992 B2 | 6/2006 | Leong et al. |
| 7,068,151 B2 | 6/2006 | Giles et al. |
| 7,173,383 B2 | 2/2007 | Vornsand et al. |
| 7,319,805 B2 | 1/2008 | Remillard et al. |
| 7,332,877 B2 * | 2/2008 | Crodian et al. ............ 315/297 |
| 2005/0047134 A1 | 3/2005 | Mueller et al. |
| 2006/0022214 A1* | 2/2006 | Morgan et al. ............... 257/99 |
| 2006/0043901 A1 | 3/2006 | Ito et al. |
| 2006/0146553 A1 | 7/2006 | Zeng et al. |
| 2006/0152172 A9 | 7/2006 | Mueller et al. |
| 2006/0158319 A1 | 7/2006 | Kim |
| 2006/0170370 A1 | 8/2006 | De Anna |
| 2006/0197474 A1 | 9/2006 | Olsen |
| 2006/0226795 A1 | 10/2006 | Walter et al. |
| 2006/0237636 A1 | 10/2006 | Lyons et al. |
| 2006/0271261 A1 | 11/2006 | Flores et al. |

FOREIGN PATENT DOCUMENTS

| | | |
|---|---|---|
| JP | 2000004048 | 1/2000 |
| JP | 2001069667 | 3/2001 |
| JP | 2002052978 | 2/2002 |

OTHER PUBLICATIONS

Zlotnick, Fred, New Tri-Color LED Driver Mimimizes Control Lines on MCU, Publication Order No. AND8091/D, Aug. 2002-Rev. 2, pp. 1-4, Semiconductor Components Industries, LLC, 2002.

* cited by examiner

APPARATUS AND METHOD FOR DIMMING FUNCTION TO CONTROL LED INTENSITY

BACKGROUND OF THE INVENTION

1. Technical Field

The embodiments of the present invention generally relate to interior lighting in a vehicle.

2. Background Art

Conventional electrical architectures used in vehicles fail to allow a user to select different colors of light in the interior of the vehicle. Passengers in vehicles today have no choice but to accept baseline lighting schemes offered by a vehicle manufacturer. Such lighting schemes fail to allow the driver in the vehicle to select a lighting scheme to expresses the driver's sense of individuality.

Accordingly, it would be desirable to implement an interior lighting scheme that allows a driver or the passengers in a vehicle to select a particular type of lighting to be displayed in the interior of the vehicle. It would also be desirable to implement an interior lighting scheme that allows a driver or the passengers in a vehicle to use such a lighting strategy simultaneously with the use of a baseline lighting strategy commonly employed by vehicle manufacturers.

SUMMARY

In one non-limiting embodiment, a system is provided for controlling interior lighting in a vehicle. The system is adapted to project a preselected color of light selected by user from a plurality of colors. The system generally includes one or more light emitting devices arrangements, a color selection device and a controller. The one or more lighting arrangements are positioned throughout the vehicle and capable of projecting the plurality of colors of light. The color selection device is configured to generate a signal. The controller is operable to present one or more pulse width modulated (PWM) signals which correspond to the preselected color of light to the lighting arrangements in response to the signal.

DETAILED DESCRIPTION OF THE PREFERRED EMBODIMENT(S)

Figure 1:
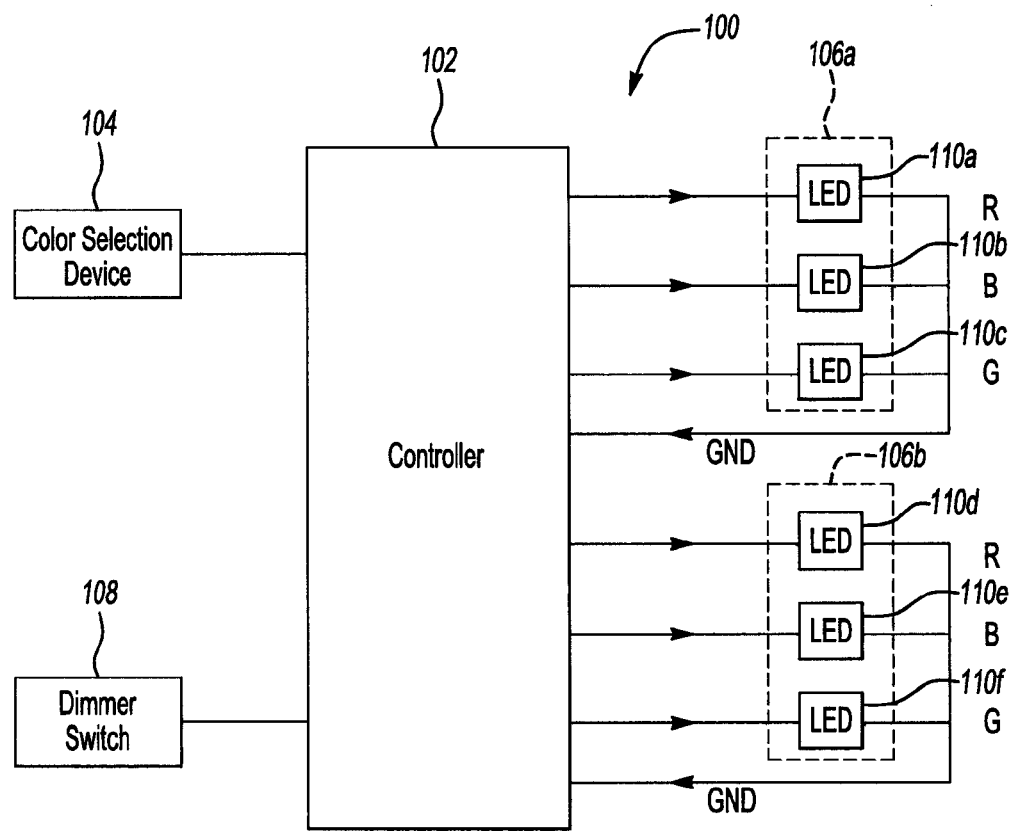
FIG. 1 illustrates a system for controlling interior lighting in a vehicle in accordance with an embodiment of the present invention.

Referring to FIG. 1, a system 100 for controlling interior lighting in a vehicle in accordance with one embodiment of the present invention is shown. The system 100 includes a controller 102. A plurality of lighting arrangements 106a-106b may be coupled and controlled by the controller 102. The lighting arrangement 106a includes one or more LEDs 110a-110c. The lighting arrangement 106b includes one or more light emitting devices (LEDS) 110d-110f. The LEDs 110a-110f may be configured to emit a plurality of colors in response to signals received by the controller 102. While the present embodiment illustrates the use of LEDs, other types of lighting devices may be adapted for use in the system 100. The particular type of lighting device used to display light may be varied to meet the design criteria of a particular implementation.

A color selection device 104 may be coupled to the controller 102. A user may select a preselected color of light from the plurality of colors via the color selection device 104 and the controller 102. In general, the system 100 may allow a user to select between the colors of red, green and blue; or any color formed by combining the colors of red, blue or green.

A dimmer switch 108 may be coupled to the controller 102. The dimmer switch 108 may control the intensity at which the preselected color of light is displayed. The controller 102 is configured to generate one or more pulse width modulated (PWM) signals. The controller 102 transmits the PWM signals to the LEDs 110a-110n. The LEDs 110a-100n generally display base colors and additional colors. The base colors may comprise the colors of red, blue and green. The LEDs 110a and 110d may be configured to display the color red. The LEDs 110b and 110e may be configured to display the color blue. The LEDs 110c and 110f may be configured to display the color green. The LEDs 110a-110f may be configured to combine any variation of red, blue or green to generate the additional colors in response to the PWM signals. Any color formed by combining the base colors may be presented to the user as an additional color.

The PWM signals generated by the controller 102 may each include a predetermined duty cycle rate. The predetermined duty cycle rates generally correspond to the preselected color of light (which may include a base color or an additional color). Each color selected by the user may have a predetermined duty cycle rate. The base colors may be generated by cycling any one of the LEDS 110a, 110b and 110c at a various duty cycle rates. In one non-limiting example, to generate the color red, the LEDs 110a and 110d may be cycled at 100% duty cycle. By cycling each LED 110a, 110b, and 110c at similar or different duty cycle rates, the combination of the similar or different cycle rates across the LEDs 110a-110c may display any one of the base colors or the additional colors. The dimmer switch 108 may increase or decrease the amplitude or duty cycle of the PWM signals in order to increase or reduce the intensity of the base colors or the additional colors.

The system 100 may provide an ambient lighting scheme in the interior of the vehicle. The system 100 may be implemented anywhere within the interior of the vehicle. In one non-limiting example, the lighting arrangements 106a-106b may be packaged in a first portion of the vehicle. The first portion of the vehicle may include a center console having front/rear cup holders. The system 100 while implemented in the first portion of the vehicle may be adapted to complement an interior lighting arrangement which comprises LED based lighting in the instrument panel or a bulb based lighting scheme in the instrument panel. In such a configuration, the LEDs 110a-110f of the system 100 may be configured to dim at the same intensity as the lighting provided in the interior lighting arrangement in response to a signal received by the dimmer switch 108.

In one example, the controller 102 may be implemented as a standalone lighting module packaged in the interior of the vehicle. In another example, the controller 102 may be implemented along with a smart junction block (SJB) controller (not shown). The SJB controller may control a number of features related to and not limited to remote keyless entry, panic alarm, horns, rear defrost, electronic locking/unlocking, and vehicle lighting (interior and exterior). The particular location in which the controller 102 is packaged may be varied to meet the design criteria of a particular implementation.

In one non-limiting example, the color selection device 104 may provide a hardwired input to the controller 102. In such an example, the color selection device 104 may be implemented as a two state switch. The switch may be normally open. The controller 102 may be configured to step through and provide any one of the plurality of colors in response to the controller 102 detecting that the color selection device 104 (e.g., the switch) has toggled to ground (or is in a closed state). In another non-limiting example, the color selection device 104 may include dedicated settings that correspond to particular colors of light and allow a user the capability of directly selecting the preselected color of light. The color selection device 104 in such an arrangement may provide a binary coded output which is sent to the controller 102. The controller 102 in turn, may generate the preselected color of light in response to the binary coded output.

In another non-limiting example, the selection device 104 may be implemented as a user interface. The controller 102 may also be adapted to receive multiplexed message commands from the user interface in the vehicle. The user interface may be packaged in an instrument cluster in the instrument panel. In general, the user interface may be positioned anywhere in the vehicle. The user interface may send a multiplexed bus message which corresponds to the preselected color of light to the controller 102. In response to receiving the bus message, the controller 102 may output the corresponding predetermined duty cycle rate for the preselected color of light. The user interface and the controller 102 may be adapted to support a medium or high speed controller area network (CAN) and/or local interconnect network (LIN) to allow such communication to and from the user interface. The controller 102 and the user interface may be implemented to incorporate any type multiplexed communication protocol used in a vehicle. The particular type of multiplexed communication protocol used in the system 100 may be varied to meet the design criteria of a particular implementation.

In one non-limiting example, the dimmer switch 108 may be implemented as a potentiometer based switch. The dimmer switch 108 includes a thumb-wheel based device configured to vary resistance varied as the user moves the thumb-wheel. The controller 102 may adjust the amplitude of the voltages on the PWM signals based on the resistance detected from the dimmer switch 108. If the user desires less intensity at the LEDs 110a-110f, the user may adjust the dimmer switch 108 accordingly and the controller 102 may reduce the amount of voltage that is applied to the LEDs 110a-110f.

In another non-limiting example, the dimmer switch 108 may be implemented along with a dimmer controller (not shown). The dimmer controller may be packaged in the controller 102 or as a stand alone module. The dimmer controller may support a multiplexed communication protocol. The dimmer switch 108 may present multiplexed messages that correspond to a number of different levels of intensity for interior lighting. In response to such different levels of intensity, the dimmer controller may also include a look up table which correlates the different levels of intensity to various PWM signals.

Figure 2:
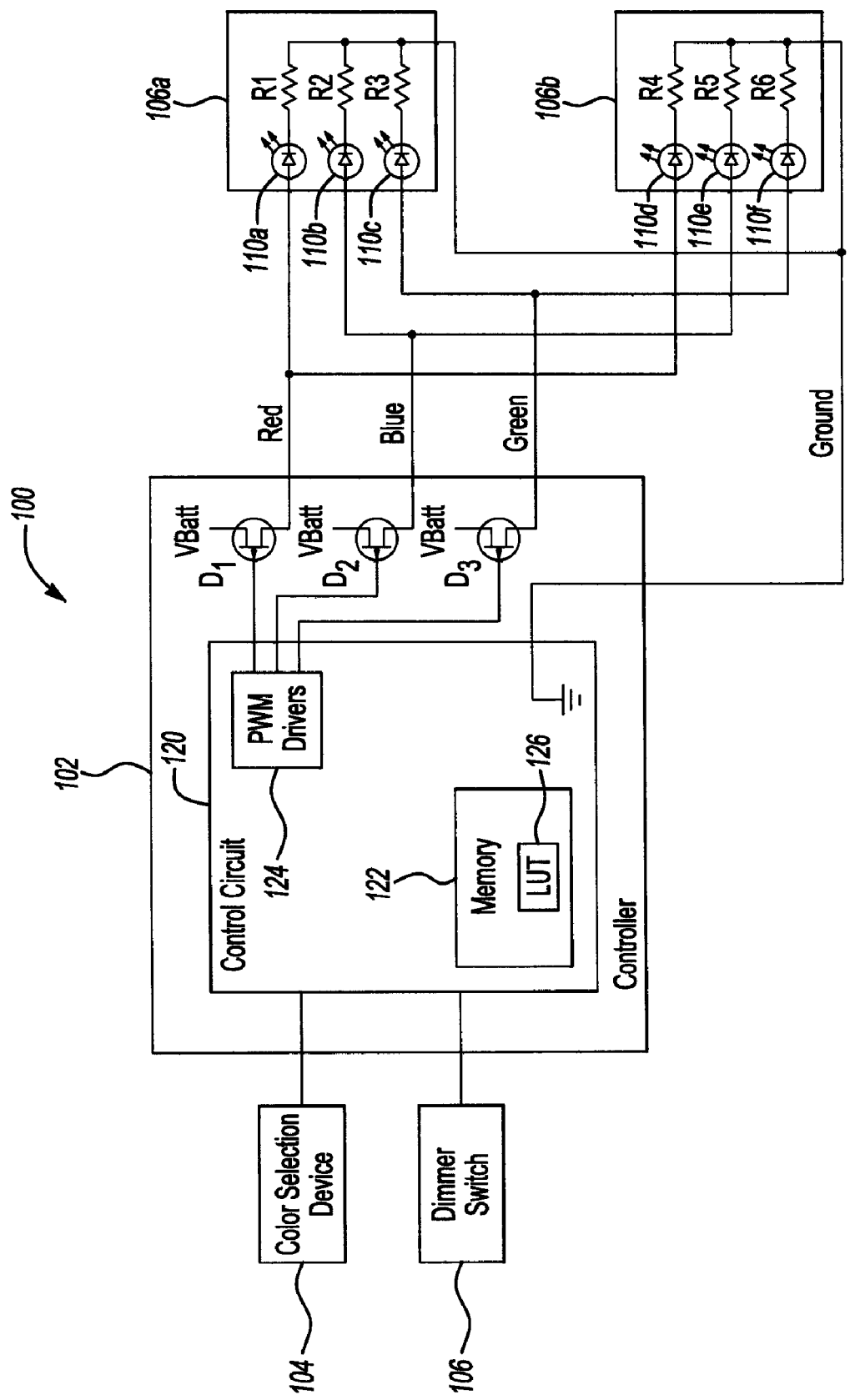
FIG. 2 illustrates a more detailed view of the controller and the lighting arrangements in the system.

Referring to FIG. 2, a more detailed view of the controller 102 in the system 100 is shown in accordance to one embodiment of the present invention. The controller 102 includes a control circuit 120 that is configured to generate the PWM signals used to drive the LEDs 110a-110f. The control circuit 120 includes a memory 122 and a PWM driver circuit 124. The memory 122 may be implemented as an Electrically Erasable Programmable Read-Only Memory (EEPROM) (or non-volatile memory). The memory 122 is generally configured to retain data regardless of whether of power being applied to the controller 102. The memory 122 includes a lookup table (LUT) 126. The LUT 126 includes a plurality of values that correspond to the predetermined duty cycles rates. As noted in connection with FIG. 1, the predetermined duty cycle rates are generally associated with base and additional colors that may be selected by the user.

The controller 102 includes a plurality of transistors D1-D3. Transistors D1-D6 may be implemented as field effect transistors. Gates of the transistors D1-D3 may be coupled to the PWM driver circuit 124. Sources of the transistors D1-D3 may be coupled to battery voltage (Vbatt) (a 12V power supply provided from the battery of the vehicle). Drains of the transistors D1-D3 may be coupled to the LEDs 110a-110f. A return line from the lighting arrangements 106a-106b may be sent to the control circuit 120 to provide a ground for the LEDs 110a-110f and the transistors D1-D3. Vbatt may be supplied to the transistors D1-D3 via park lamp and/or headlamp circuitry.

Each lighting arrangement 106a-106b may include a circuit board (not shown) which will be discussed in more detail in connection with FIG. 3. For the lighting arrangement 106a, resistors R1-R3 may be positioned on the circuit board. Resistor R1 may be coupled in series to the LED 110a. Resistor R2 may be coupled in series to the LED 110b. Resistor R3 may be coupled in series to the LED 110c. Resistors R1-R3 are tied together and tied to GND in the controller 102. Resistors R1-R3 are tied in series with the LEDs 110a-110c to ensure the LEDs 110a-110c do not blow due to over current conditions. The value of resistors R1-R3 may be varied to meet the design criteria of a particular implementation.

For the lighting arrangement 106b, resistors R4-R6 may be positioned on the circuit board. Resistor R4 may be coupled in series to the LED 110d. Resistor R5 may be coupled in series to the LED 110e. Resistor R6 may be coupled in series to the LED 110f. Resistors R4-R6 are tied together and are tied to GND in the controller 102. Resistors R4-R6 are tied in series with the LEDs 110d-110f to ensure the LEDs 110d-110f do not blow due to over current conditions. The value of resistors R4-R6 may be varied to meet the design criteria of a particular implementation. In one non-limiting example, the LEDs 110a-110c may be packaged together as a single 6-pin package. The particular implementation of the LEDs 110a-110c as either stand alone LEDs or as a single multicolor LED package may be varied to meet the design criteria of a particular implementation. In another non-limiting example, the resistors R1-R6 and the LEDs 110a-110f may be implemented as standard surface mount components. One or more capacitors (not shown) may be positioned on the circuit board to protect for electro-static-discharge (ESD) protection.

In operation, the user may select the preselected color of light. The controller 102 generates the preselected color of light in response to the color selection device 104. The memory 122 (via the LUT 126) presents the value which corresponds to the preselected color of light to the PWM driver circuit 124. The PWM driver circuit 124 drives the transistors D1-D3 at the corresponding predetermined duty cycle rates. The PWM driver circuit 124 controls the switching of the transistors D1-D3 via the gates of transistors D1-D3. The transistors D1-D3 may each present the PWM signal at the predetermined duty cycle rate based on which color of light selected by the user. While the system 100 generally illustrates the use of transistors D1-D3 for switching the LEDS 110a-110f on or off, any type of switching device may be adapted with the system 100 to turn the LEDs 110a-110n on or off. In one example, contact switches may be driven by the control circuit 120 such that the contacts open and close based on a modulated inputs provided by the control circuit 120. The contact switches may provide a modulated output that may be used to drive the LEDs 110a-110f in response to the modulated inputs provided by the control circuit 120. The switching devices may also be implemented as LED drivers. The type of switching device implemented in the system 100 may be varied to meet the design criteria of a particular implementation.

In one non-limiting example, if the user selects the color white as the preselected color of light, the LUT 126 may select the values which corresponds to the color white and control the PWM driver circuit 124 such that the PWM driver circuit 124 drives the transistors D1-D3 each at a 50% duty cycle rate. In response to being driven at the 50% duty cycle rate, the LED arrangement 106a displays the color white due to the mixing of the red, blue and green colors at the 50% duty cycle rate. The memory 122 may retain the last known preselected color of light as the default preselected color of light. The preselected color of light may remain white until the user toggles the color selection device 104 to change the color. The system 100 may display any one of the plurality of colors when the park lamps/headlamps are on. The system 100 may also be adapted to display any one of the plurality of colors when the key is out of ignition.

In another non-limiting example, if the user selects the color purple as the preselected color of light, the LUT 126 may select the values which corresponds to the color purple and provide the value to the control circuit 120. The control circuit 120 drives the transistor D1 at an 80% duty cycle rate and the transistor D2 at a 50% duty rate. In response to being driven at a 80% and 50% duty cycle rates, the lighting arrangements 106a and 106b may in combination display the color purple due to the mixing of red and blue colors. The transistors D3 may remain off in such an example. The memory 122 may retain the last known preselected color of light as the default preselected color of light. The preselected color of light may remain purple until the user toggles the color selection device 104 to change the color.

Figure 3:
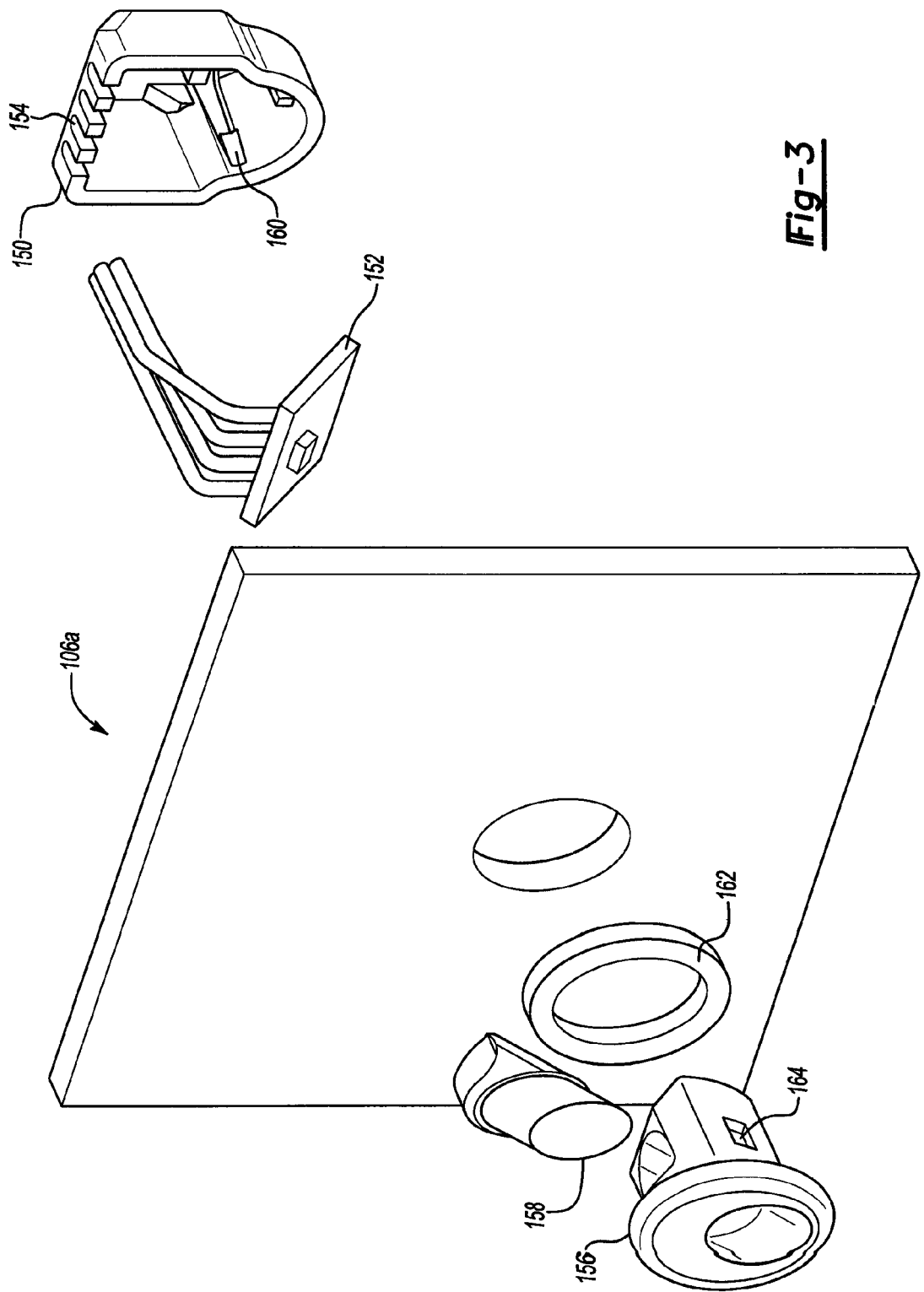
FIG. 3 illustrates an exploded view of the lighting arrangement.

Referring to FIG. 3, an exploded view of the lighting arrangement 106a is shown in accordance to one embodiment of the present invention. The lighting arrangement 106a includes a housing 150 and a circuit board 152. Wires are soldered to the circuit board 152 and are configured to receive signals from the controller 102. The circuit board 152 includes the LEDs 110a-110c and the resistors R1-R3. The housing 150 includes a plurality of slots 150 for receiving the wires.

The lighting arrangement 106a further includes a bezel 156 and a lens 158. The bezel 156 and lens 158 are generally shaped in the form of semi-circle. The particular shape and size of the bezel 156 and the lens 158 may be varied to meet the design criteria of a particular implementation. The bezel 156 is configured to slideably receive the lens 158. A face of the lens 158 is generally flush with the bezel 156 when the lens 158 is fully seated in the bezel 156. The color displayed from the LEDs 110a-110n may be projected through the lens 158. An end of the bezel 156 is configured to support the circuit board 152 at a particular angle such that the LEDs 110a-110n are centered over the lens 158. The lens 158 may be made of acrylic and include graining.

A foam spacer 162 may be positioned between the bezel 156 and the housing 150 in order to prevent the LEDs 110a-110f from exposure to water and to prevent light from being emitted from any gaps created between the lighting arrangement 106a and the interior piece of trim as the lighting arrangement 106a is seated in the interior piece of trim. The housing 150 includes a plurality of sliding ribs 160 disposed in the interior of the housing 150. A plurality of recesses 164 are positioned in an exterior portion of the bezel 156. The housing 150 is configured to retain the bezel 156, the lens 158, the spacer 162 and the circuit board 152 against the trim via a snap lock arrangement formed between the plurality of recesses 164 and the sliding ribs 160.

Figure 4A:
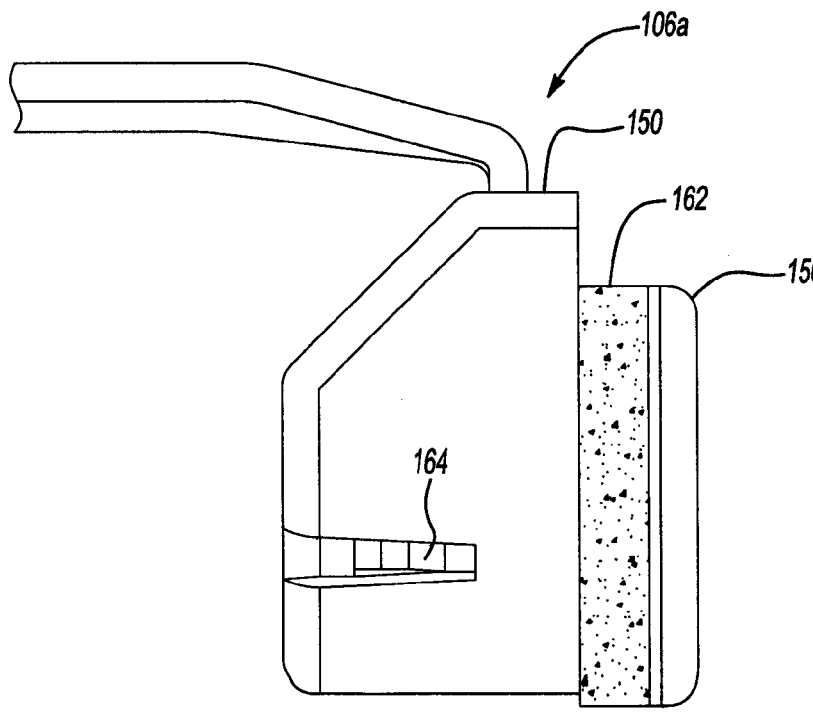
FIGS. 4a-4c illustrates front, top and side views of the lighting arrangement
Figure 4B:
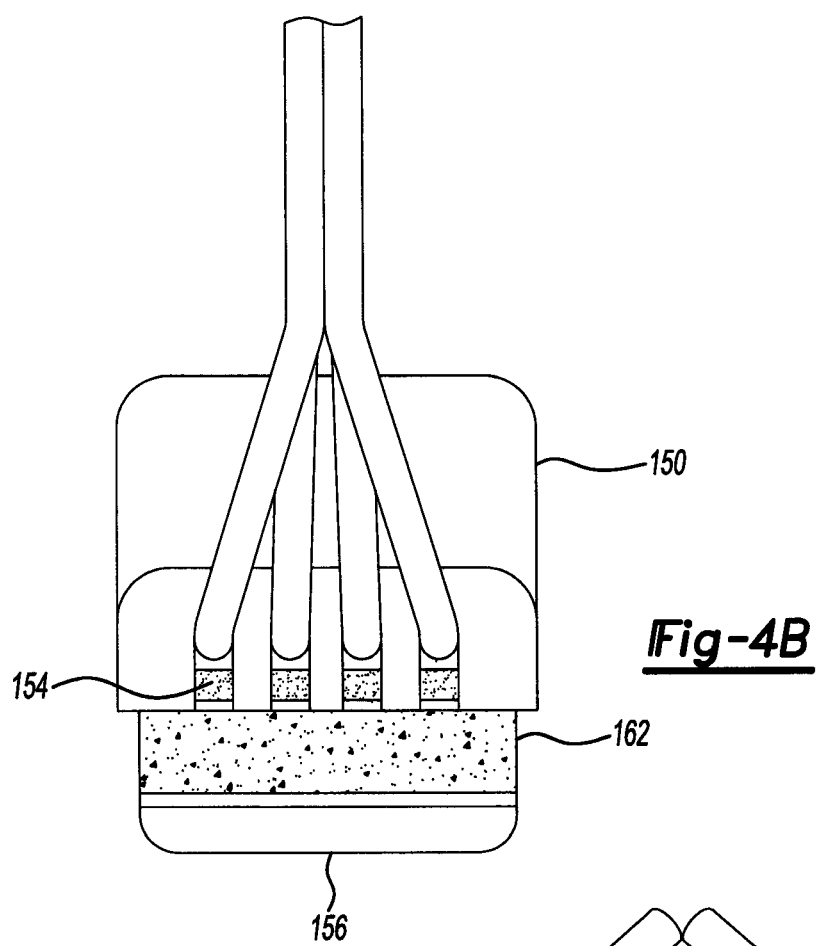
Figure 4C:
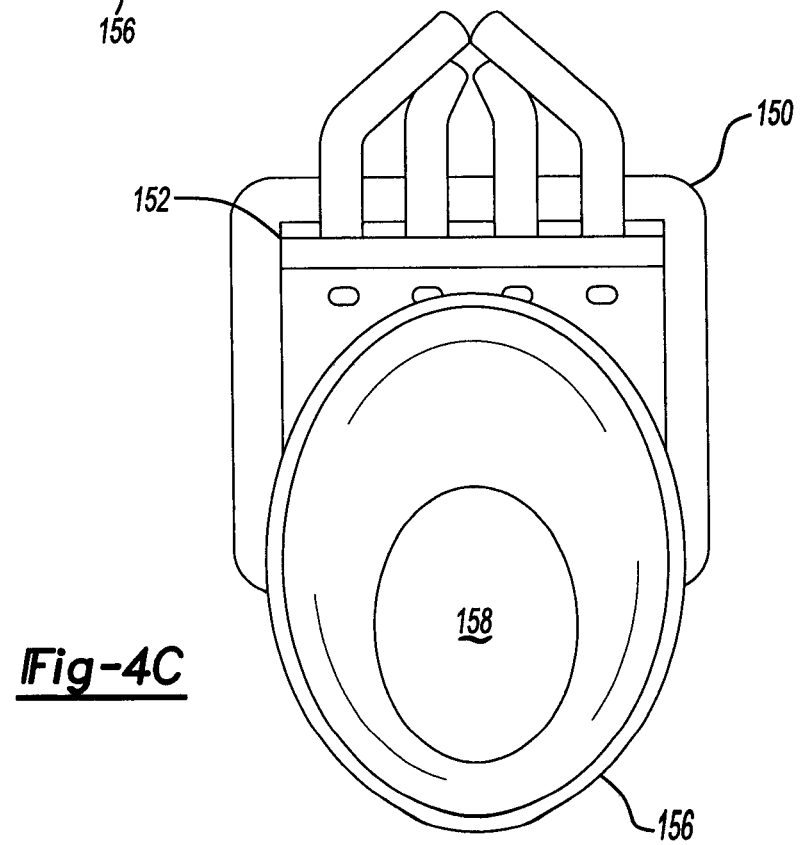

FIG. 4A generally illustrates a side view of the lighting arrangement 106a. FIG. 4B generally illustrates a top view of the lighting arrangement 106a. FIG. 4C generally illustrates a front view of the lighting arrangement 106a.

Figure 5:
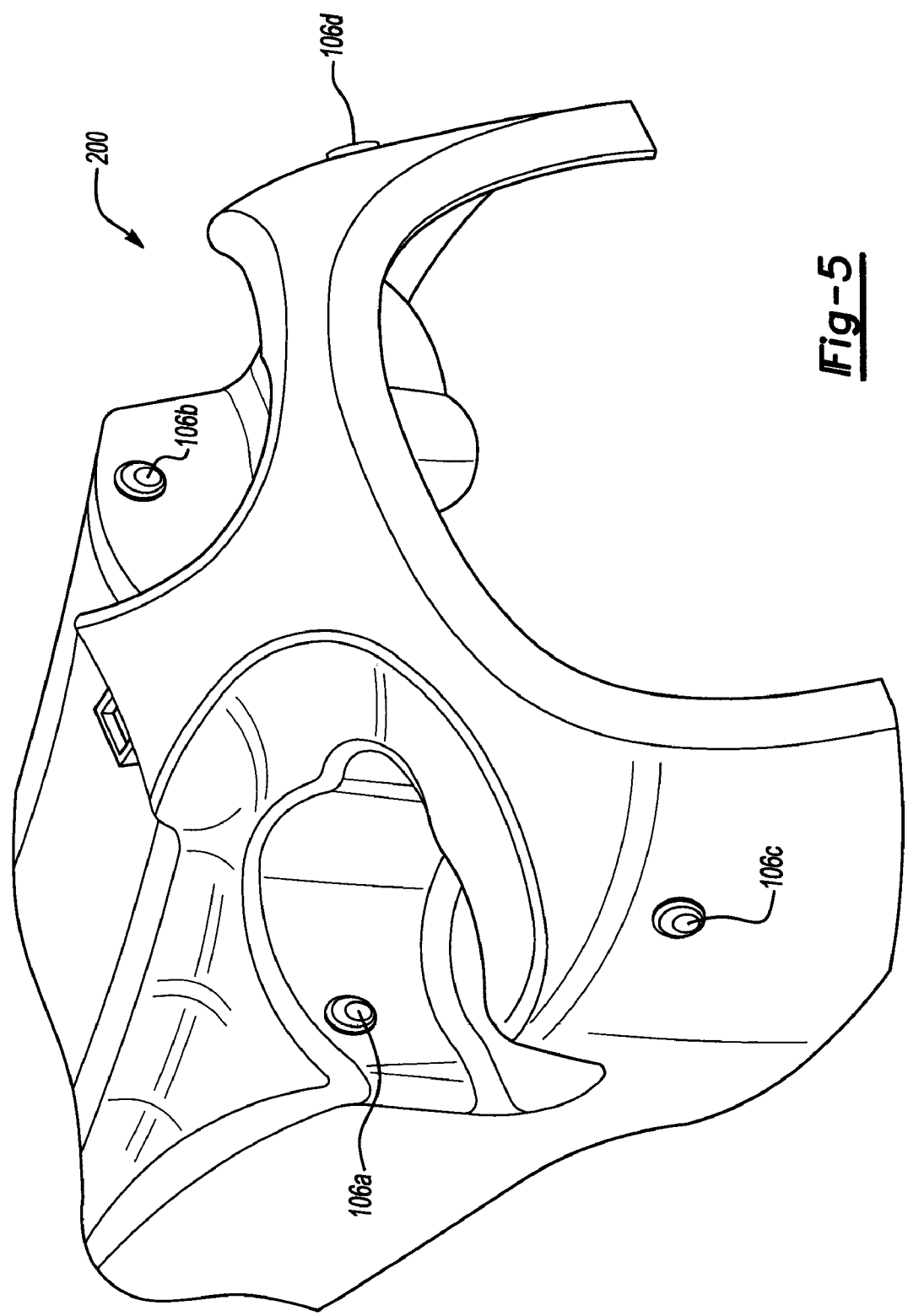
FIG. 5 illustrates one example of the system implemented in a center console area of the vehicle.

FIG. 5, generally illustrates a center console 200 adapted to support the one or more lighting arrangements 106a-106d. The center console 200 includes a driver side cup holder 202 and a passenger side cup holder 204. The lighting arrangement 106a may be positioned in the passenger side cup holder 202. The lighting arrangement 106b may be positioned in the driver side cup holder 204. The lighting arrangement 106c may be positioned in the center console 200 such that the lighting arrangement 106c provides ambient lighting for the passenger side foot well. The lighting arrangement 106d may be positioned in the center console 200 such that the lighting arrangement 106d provides ambient lighting for the driver side foot well. Additional lighting arrangements (not shown) may be positioned toward the rear of the center console 200 such that ambient lighting may be provided to passengers seated in the rear of the vehicle. In general, the lighting arrangements 106a-106n may be configured to provide ambient lighting for predesignated areas of the vehicle when the park lamps and/or the headlamps are turned on. Additional non-limiting examples may include positioning the lighting arrangements 106a on doors interior to the vehicle or in preselected areas of the instrument panel. The particular positioning of the lighting arrangements 106a-106d in the vehicle may be varied to meet the design criteria of a particular implementation.

While the best mode for carrying out the invention has been described in detail, those familiar with the art to which this invention relates will recognize various alternative designs and embodiments for practicing the invention as defined by the following claims.

What is claimed:

1. A system for controlling interior lighting in a vehicle and the system being adapted to project a preselected color of light selected by user from a plurality of colors, the system comprising:
   one or more lighting arrangements positioned throughout the vehicle and capable of projecting the plurality of colors of light;
   a color selection device configured to generate a signal;
   a dimmer switch operable to present a first signal which corresponds to an intensity of the preselected color of light; and
   a controller operable to present one or more pulse width modulated (PWM) signals which correspond to the preselected color of light to the one or more lighting arrangements in response to the signal, the controller further configured to control the intensity of the preselected color of light in response to the first signal.

2. The system of claim 1, wherein the plurality of colors of light includes one or more base colors and one or more additional colors, the one or more additional colors are derived from combining the one or more base colors.

3. The system of claim 1, wherein each PWM signal includes a predetermined duty cycle rate that corresponds to each preselected color of light.

4. The system of claim 3, includes a memory operable to store values that correspond to the predetermined duty cycle rates needed to produce the preselected color of light.

5. The system of claim 1, wherein the one or more lighting arrangements are positioned in a first portion of the vehicle.

6. The system of claim 5, further comprising a first interior lighting arrangement projecting a first color of light for providing additional lighting in the interior of the vehicle.

7. The system of claim 6, wherein the first interior lighting arrangement is positioned in a second portion of the vehicle.

8. The system of claim 1, wherein each lighting arrangement includes:
   one or more lighting devices configured to emit the preselected color of light;
   a circuit board adapted to support the one or more lighting devices;
   a foam spacer configured to prevent liquid from contacting the one or more lighting devices;
   a lens configured to direct the preselected color of light in a particular orientation;
   a bezel adapted to support the lens and coupled to the housing; and
   a housing configured to support the circuit board and the bezel.

9. The system of claim 1, wherein the controller includes one or more switching devices configured to generate the one or more PWM signals and each PWM signal includes a predetermined duty cycle rate that corresponds to each preselected color of light.

10. The system of claim 9, wherein the controller includes a non-volatile memory having a look up table configured to store values that correspond to predetermined duty cycle rates.

11. A method for controlling interior lighting in a vehicle to project a preselected color of light from a plurality of colors selected by a user, the method comprising:
   positioning one or more lighting arrangements throughout the vehicle, the lighting arrangements being capable of projecting the plurality of colors of light;
   generating a signal; and
   presenting one or more pulse width modulated (PWM) signals which correspond to the preselected color of light to the one or more lighting arrangements in response to the signal;
   wherein each lighting arrangement includes:
   one or more lighting devices configured to emit the preselected color of light;
   a circuit board adapted to support the one or more lighting devices;
   a foam spacer configured to prevent liquid from contacting the one or more lighting devices;
   a lens configured to direct the preselected color of light in particular orientation;
   a bezel adapted to support the lens and coupled to the housing; and
   a housing configured to support the circuit board and the bezel.

12. The method of claim 11, wherein the plurality of colors of light includes one or more base colors and one or more additional colors derived from combining the one or more base colors.

13. The method of claim 11, wherein each PWM signal includes a predetermined duty cycle rate that corresponds to the preselected color of light.

14. The method of claim 13, further comprising storing the predetermined duty cycle rates needed to produce the preselected color of light.

15. The method of claim 13, further comprising controlling an intensity of the preselected color of light.

16. A system for controlling interior lighting in a vehicle and the system being adapted to project a preselected color of light from a plurality of colors selected by a user, the system comprising:
   one or more lighting arrangements positioned in a first portion of the vehicle and capable of projecting the plurality of colors of light;
   a first interior lighting arrangement positioned in a second portion of the vehicle and capable of projecting a first color of light for providing additional lighting in the interior of the vehicle;
   a color selection device configured to generate a first signal;
   a dimmer switch configured to generate a second signal that corresponds to an intensity level of the first color of light and the preselected color of light; and
   a controller operable to present one or more pulse width modulated (PWM) signals having predetermined duty cycle rates which correspond to the preselected color of light to the one or more lighting arrangements in response to the first signal, the controller configured to adjust the intensity of the preselected color of light at the same rate the intensity of the first color of light is adjusted in response to the second signal.

17. The system of claim 16, further comprising a dimmer switch operable to present a first signal which corresponds to an intensity of the preselected color of light and the controller is configured to control the intensity of the preselected color of light in response to the first signal.

18. The system of claim 16, wherein each lighting arrangement includes:
   one or more lighting devices configured to emit the preselected color of light based on the predetermined duty cycle rates;
   a circuit board adapted to support the one or more lighting devices;
   a foam spacer configured to prevent liquid from contacting the one or more lighting devices;
   a housing configured to support the circuit board;
   a lens configured to direct the preselected color of light in a particular orientation; and
   a bezel adapted to support the lens and coupled to the housing.

* * * * *